(12) United States Patent
Kuo

(10) Patent No.: US 11,621,634 B1
(45) Date of Patent: Apr. 4, 2023

(54) ELECTRONIC DEVICE

(71) Applicant: Quanta Computer Inc., Taoyuan (TW)

(72) Inventor: Hsin-Chih Kuo, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 0 days.

(21) Appl. No.: 17/685,841

(22) Filed: Mar. 3, 2022

(30) Foreign Application Priority Data

Jan. 18, 2022 (TW) .................................. 111101919

(51) Int. Cl.
*H02M 3/156* (2006.01)

(52) U.S. Cl.
CPC .................. *H02M 3/156* (2013.01)

(58) Field of Classification Search
None
See application file for complete search history.

(56) References Cited

U.S. PATENT DOCUMENTS

| | | | | |
|---|---|---|---|---|
| 6,031,364 | A * | 2/2000 | Hosono | G05F 1/575 323/280 |
| 7,378,889 | B2 | 5/2008 | Wu | |
| 9,246,402 | B2 * | 1/2016 | Sakurai | H02M 7/217 |
| 9,606,556 | B2 * | 3/2017 | Takano | G05F 1/468 |
| 9,703,305 | B2 * | 7/2017 | Sakurai | G01R 19/00 |
| 2020/0039379 | A1 * | 2/2020 | Schlosser | B60K 6/28 |

FOREIGN PATENT DOCUMENTS

| | | |
|---|---|---|
| CN | 112332820 A | 2/2021 |
| TW | 200617631 A | 6/2006 |

OTHER PUBLICATIONS

TW Office Action dated Feb. 8, 2023 in Taiwan application No. 111101919.
Search Report issued in TW Office Action dated Feb. 8, 2023 in Taiwan application No. 111101919.

* cited by examiner

*Primary Examiner* — Jeffery S Zweizig
(74) *Attorney, Agent, or Firm* — McClure, Qualey & Rodack, LLP

(57) ABSTRACT

An electronic device includes a hysteresis circuit, a voltage divider circuit, a control circuit, and a discharge resistor. The hysteresis circuit has a first threshold voltage and a second threshold voltage. The hysteresis circuit generates a hysteresis voltage according to an output voltage at an output node. The voltage divider circuit generates a divided voltage according to the output voltage and the hysteresis voltage. The control circuit has a reference voltage and monitors the divided voltage. If the divided voltage is lower than the reference voltage, the control circuit will use the discharge resistor to perform a discharging operation to the output voltage at the output node.

10 Claims, 5 Drawing Sheets

ELECTRONIC DEVICE

CROSS REFERENCE TO RELATED APPLICATIONS

This application claims priority of Taiwan Patent Application No. 111101919 filed on Jan. 18, 2022, the entirety of which is incorporated by reference herein.

BACKGROUND OF THE INVENTION

Field of the Invention

The disclosure generally relates to an electronic device, and more specifically, to an electronic device with a fast discharge function.

Description of the Related Art

In conventional electronic devices, the output capacitor is usually coupled to a discharge resistor. If the resistance of the discharge resistor is too high, the electronic device may discharge very slowly. Conversely, if the resistance of the discharge resistor is too low, it may result in much non-ideal loss of the electronic device. Accordingly, there is a need to propose a novel solution for solving the problems of the prior art.

BRIEF SUMMARY OF THE INVENTION

In an exemplary embodiment, the invention is directed to an electronic device that includes a hysteresis circuit, a voltage divider circuit, a discharge resistor, and a control circuit. The hysteresis circuit has a first threshold voltage and a second threshold voltage. The hysteresis circuit generates a hysteresis voltage according to an output voltage at an output node. The voltage divider circuit generates a divided voltage according to the output voltage and the hysteresis voltage. The control circuit has a reference voltage and monitors the divided voltage. If the divided voltage is lower than the reference voltage, the control circuit will use the discharge resistor to perform a discharging operation to the output voltage at the output node.

In some embodiments, if the divided voltage is higher than or equal to the reference voltage, the control circuit will disable the discharge resistor and stop the discharging operation.

In some embodiments, if the output voltage rises up and reaches the first threshold voltage, the hysteresis voltage will be switched to a low logic level. If the output voltage drops down and reaches the second threshold voltage, the hysteresis voltage will be switched to a high logic level.

In some embodiments, the hysteresis circuit includes an operational amplifier, a first resistor, a second resistor, and a DC (Direct Current) voltage source. The operational amplifier has a positive input terminal coupled to a first node, a negative input terminal for receiving the output voltage, and an output terminal coupled to a second node for outputting the hysteresis voltage. The first resistor has a first terminal coupled to the second node, and a second terminal coupled to the first node. The second resistor has a first terminal coupled to the first node, and a second terminal coupled to a third node. The DC voltage source has a positive electrode coupled to the third node, and a negative electrode coupled to a ground voltage.

In some embodiments, the voltage divider circuit includes a diode, a third resistor, and a fourth resistor. The diode has an anode coupled to the second node for receiving the hysteresis voltage, and a cathode coupled to a fourth node for outputting the divided voltage. The third resistor has a first terminal coupled to the output node for receiving the output voltage, and a second terminal coupled to the fourth node. The fourth resistor has a first terminal coupled to the fourth node, and a second terminal coupled to the ground voltage.

In some embodiments, the control circuit includes a voltage comparator for comparing the divided voltage with the reference voltage. If the divided voltage is lower than the reference voltage, the voltage comparator will couple a fifth node to the ground voltage. If the divided voltage is higher than or equal to the reference voltage, the voltage comparator will not couple the fifth node to the ground voltage.

In some embodiments, the control circuit further includes a fifth resistor and a sixth resistor. The fifth resistor has a first terminal coupled to a supply node for receiving a supply voltage, and a second terminal coupled to the fifth node. The sixth resistor has a first terminal coupled to the supply node, and a second terminal coupled to a sixth node.

In some embodiments, the control circuit further includes a first transistor. The first transistor has a control terminal coupled to the fifth node, a first terminal coupled to the ground voltage, and a second terminal coupled to the sixth node.

In some embodiments, the control circuit further includes a second transistor. The second transistor has a control terminal coupled to the sixth node, a first terminal coupled to the ground voltage, and a second terminal coupled to a seventh node. The discharge resistor has a first terminal coupled to the output node, and a second terminal coupled to the seventh node.

In some embodiments, each of the first transistor and the second transistor is an NMOS transistor (N-type Metal Oxide Semiconductor Field Effect Transistor).

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

Figure 1:
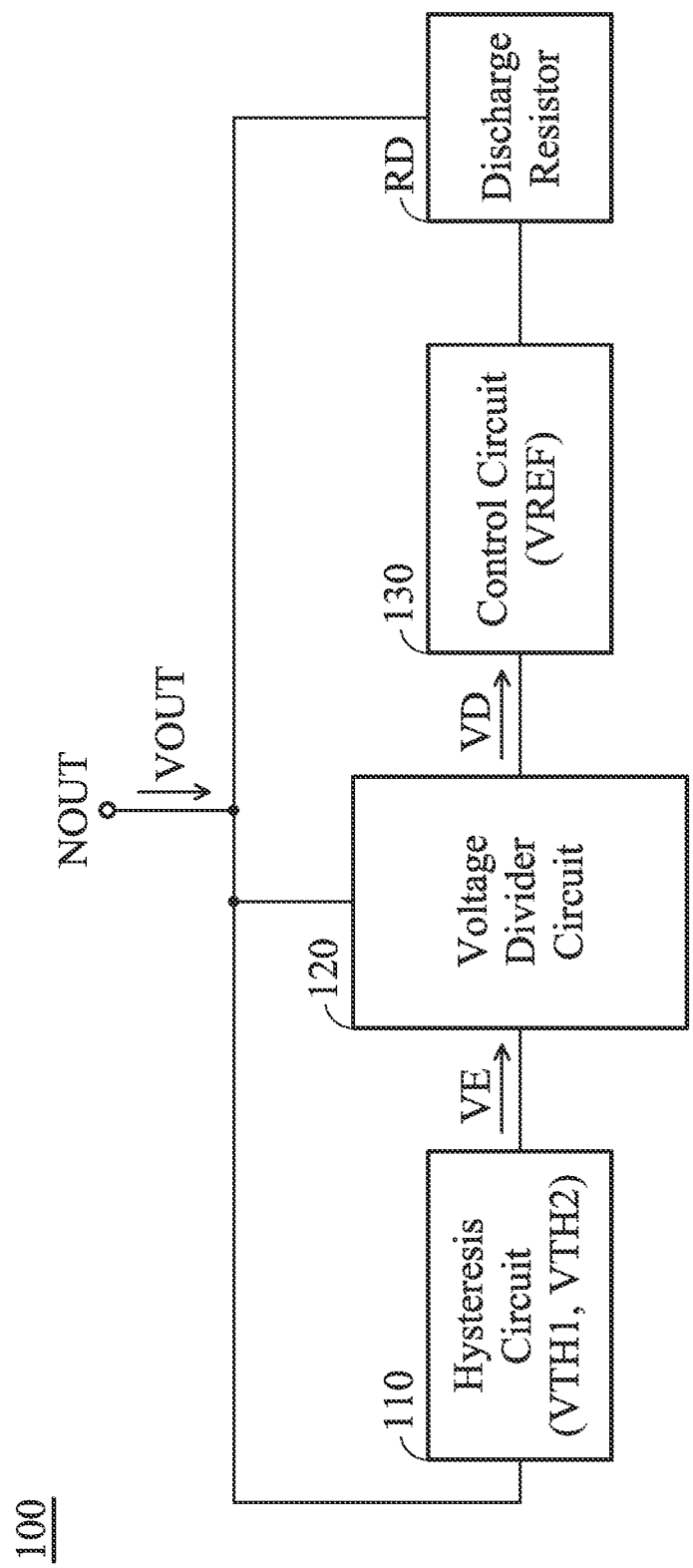
FIG. 1 is a diagram of an electronic device according to an embodiment of the invention.

In order to illustrate the purposes, features and advantages of the invention, the embodiments and figures of the invention are described in detail below.

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". The term "substantially" means the value is within an acceptable error range. One skilled in the art can solve the technical problem within a predetermined error range and achieve the proposed technical performance. Also, the term "couple" is intended to mean either an indirect or direct electrical connection. Accordingly, if one device is coupled to another device, that connection may be through a direct electrical connection, or through an indirect electrical connection via other devices and connections.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Furthermore, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

FIG. 1 is a diagram of an electronic device 100 according to an embodiment of the invention. The electronic device 100 may be applied to a mobile device, such as a smart phone, a tablet computer, or a notebook computer. As shown in FIG. 1, the electronic device 100 includes a hysteresis circuit 110, a voltage divider circuit 120, a control circuit 130, and a discharge resistor RD. Generally, the electronic device 100 is configured to dynamically adjust a discharging operation with respect to an output voltage VOUT at an output node NOUT. In some embodiments, the output node NOUT is further coupled to an output capacitor of other circuitry, but it is not limited thereto.

The hysteresis circuit 110 has a first threshold voltage VTH1 and a second threshold voltage VTH2. The first threshold voltage VTH1 and the second threshold voltage VTH2 are arranged to define the hysteresis characteristics of the hysteresis circuit 110. For example, the first threshold voltage VTH1 may be higher than the second threshold voltage VTH2. The hysteresis circuit 110 generates a hysteresis voltage VE according to the output voltage VOUT at the output node NOUT.

Figure 2:
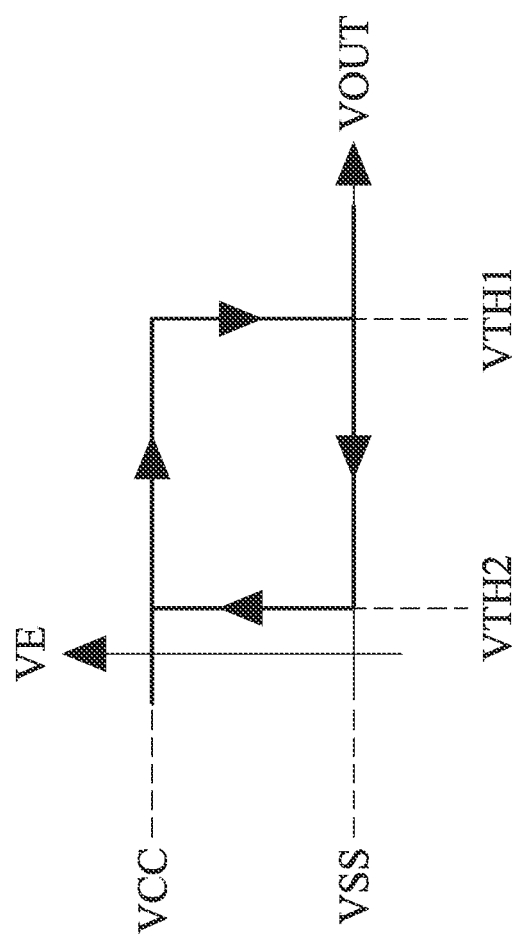
FIG. 2 is a diagram of a hysteresis curve of a hysteresis circuit according to an embodiment of the invention.

FIG. 2 is a diagram of a hysteresis curve of the hysteresis circuit 110 according to an embodiment of the invention. For example, the hysteresis circuit 110 may be called as a clockwise hysteresis circuit 110. In the embodiment of FIG. 2, if the output voltage VOUT rises up and reaches the first threshold voltage VTH1, the hysteresis voltage VE will be switched to a low logic level (e.g., a ground voltage VSS). Conversely, if the output voltage VOUT drops down and reaches the second threshold voltage VTH2, the hysteresis voltage VE will be switched to a high logic level (e.g., a supply voltage VCC).

The voltage divider circuit 120 generates a divided voltage VD according to the output voltage VOUT and the hysteresis voltage VE. The control circuit 130 has a reference voltage VREF and monitors the divided voltage VD. If the divided voltage VD is lower than the reference voltage VREF, the control circuit 130 will use the discharge resistor RD to perform a discharging operation to the output voltage VOUT at the output node NOUT. Conversely, if the divided voltage VD is higher than or equal to the reference voltage VREF, the control circuit 130 will disable the discharge resistor RD and stop the aforementioned discharging operation. With such a design, the electronic device 100 can selectively use the discharge resistor RD via a hysteresis mechanism. It not only increases the discharge speed of the electronic device 100 but also suppresses the non-ideal loss of the electronic device 100.

The following embodiments will introduce different configurations and detailed structural features of the electronic device 100. It should be understood these figures and descriptions are merely exemplary, rather than limitations of the invention.

Figure 3:
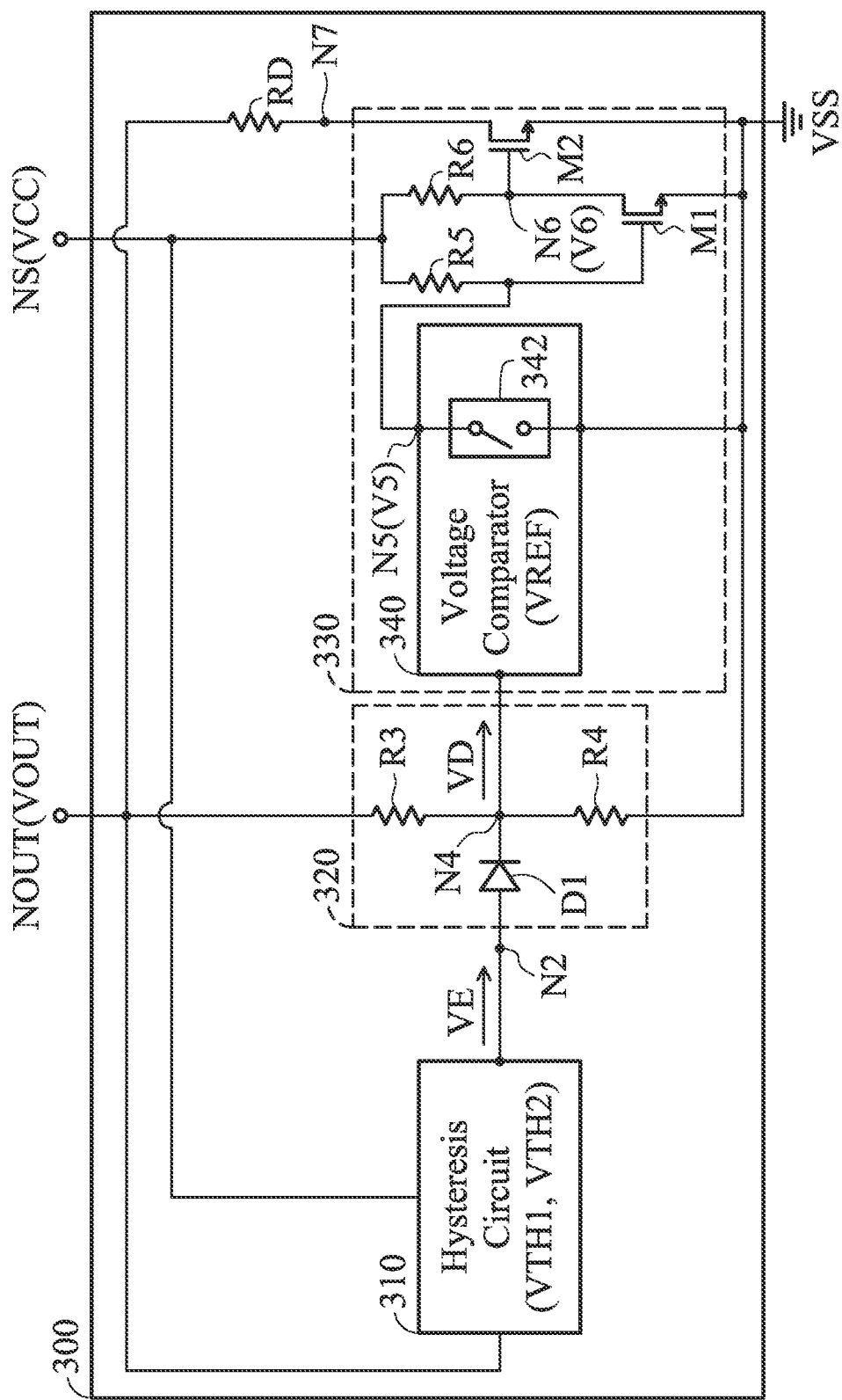
FIG. 3 is a diagram of an electronic device according to an embodiment of the invention.

FIG. 3 is a diagram of an electronic device 300 according to an embodiment of the invention. FIG. 3 is similar to FIG. 1. In the embodiment of FIG. 3, the electronic device 300 has an output node NOUT and a supply node NS, and includes a hysteresis circuit 310, a voltage divider circuit 320, a control circuit 330, and a discharge resistor RD. The output node NOUT of the electronic device 300 is arranged to receive an output voltage VOUT, which may come from an output capacitor of other circuitry (not shown). Furthermore, the supply node NS of the electronic device 300 is arranged to receive a supply voltage VCC, which can provide electric power for internal components of the electronic device 300.

The hysteresis circuit 310 is supplied by the supply voltage VCC, and has a first threshold voltage VTH1 and a second threshold voltage VTH2. The hysteresis circuit 310 generates a hysteresis voltage VE according to the output voltage VOUT. A hysteresis curve of the hysteresis circuit 310 has been described in the previous embodiment of FIG. 2.

Figure 4:
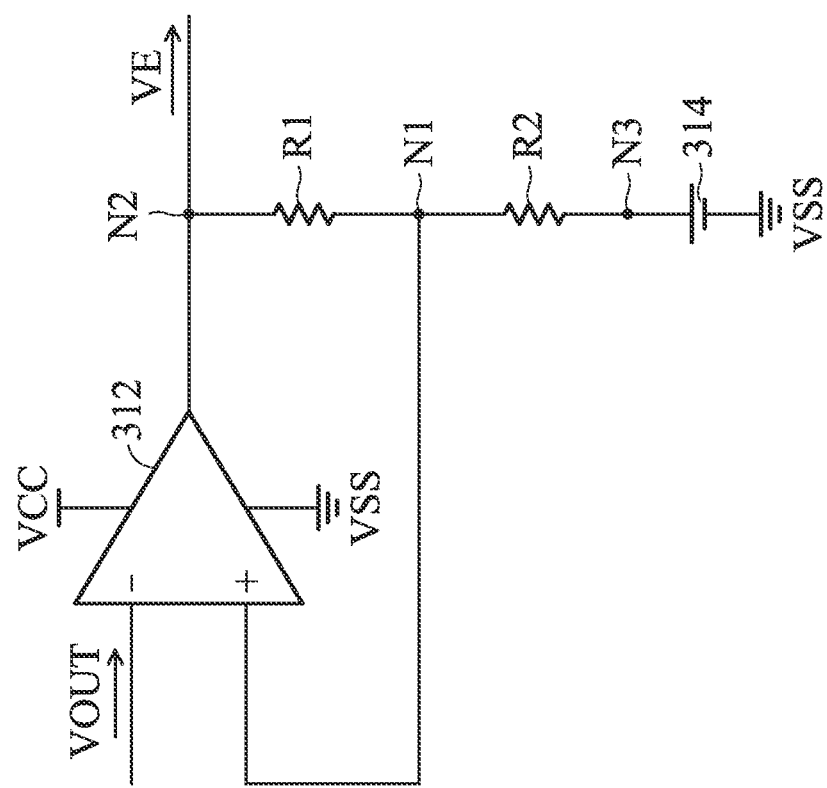
FIG. 4 is a diagram of a hysteresis circuit according to an embodiment of the invention.

FIG. 4 is a diagram of the hysteresis circuit 310 according to an embodiment of the invention. In the embodiment of FIG. 4, the hysteresis circuit 310 includes an operational amplifier (OP) 312, a first resistor R1, a second resistor R2, and a DC (Direct Current) voltage source 314. The operational amplifier 312 has a positive input terminal coupled to a first node N1, a negative input terminal for receiving the output voltage VOUT, and an output terminal coupled to a second node N2 for outputting the hysteresis voltage VE. The first resistor R1 has a first terminal coupled to the second node N2, and a second terminal coupled to the first node N1. The second resistor R2 has a first terminal coupled to the first node N1, and a second terminal coupled to a third node N3. The DC voltage source 314 has a positive electrode coupled to the third node N3, and a negative electrode coupled to a ground voltage VSS. In some embodiments, the first threshold voltage VTH1 and the second threshold voltage VTH2 of the hysteresis circuit 310 are adjustable by changing the relative parameters of the first resistor R1, the second resistor R2, and the DC voltage source 314.

The voltage divider circuit 320 includes a diode D1, a third resistor R3, and a fourth resistor R4. The diode D1 has an anode coupled to the second node N2 for receiving the hysteresis voltage VE, and a cathode coupled to a fourth node N4 for outputting a divided voltage VD. The third resistor R3 has a first terminal coupled to the output node NOUT for receiving the output voltage VOUT, and a second terminal coupled to the fourth node N4. The fourth resistor R4 has a first terminal coupled to the fourth node N4, and a second terminal coupled to the ground voltage VSS.

The control circuit 330 includes a voltage comparator 340, a fifth resistor R5, a sixth resistor R6, a first transistor M1, and a second transistor M2. For example, each of the first transistor M1 and the second transistor M2 may be an NMOS transistor (N-type Metal Oxide Semiconductor Field Effect Transistor), but it is not limited thereto.

The voltage comparator 340 compares the divided voltage VD with a reference voltage VREF. If the divided voltage VD is lower than the reference voltage VREF, the voltage comparator 340 will couple a fifth node N5 to the ground voltage VSS. Conversely, if the divided voltage VD is higher than or equal to the reference voltage VREF, the voltage comparator 340 will not couple the fifth node N5 to the ground voltage VSS. In some embodiments, the voltage comparator 340 includes an equivalent switch element 342. A terminal of the equivalent switch element 342 is coupled to the fifth node N5, and the other terminal of the equivalent switch element 342 is coupled to the ground voltage VSS. If the divided voltage VD is lower than the reference voltage VREF, the equivalent switch element 342 will be closed (i.e., it is similar to a short-circuited element). Conversely, if the divided voltage VD is higher than or equal to the reference voltage VREF, the equivalent switch element 342 will be opened (i.e., it is similar to an open-circuited element).

The fifth resistor R5 has a first terminal coupled to the supply node NS for receiving the supply voltage VCC, and a second terminal coupled to the fifth node N5. The sixth resistor R6 has a first terminal coupled to the supply node NS, and a second terminal coupled to a sixth node N6. The first transistor M1 has a control terminal (e.g., a gate) coupled to the fifth node N5, a first terminal (e.g., a source) coupled to the ground voltage VSS, and a second terminal (e.g., a drain) coupled to the sixth node N6.

The second transistor M2 has a control terminal (e.g., a gate) coupled to the sixth node N6, a first terminal (e.g., a source) coupled to the ground voltage VSS, and a second terminal (e.g., a drain) coupled to a seventh node N7. The discharge resistor RD has a first terminal coupled to the output node NOUT, and a second terminal coupled to the seventh node N7.

Figure 5:
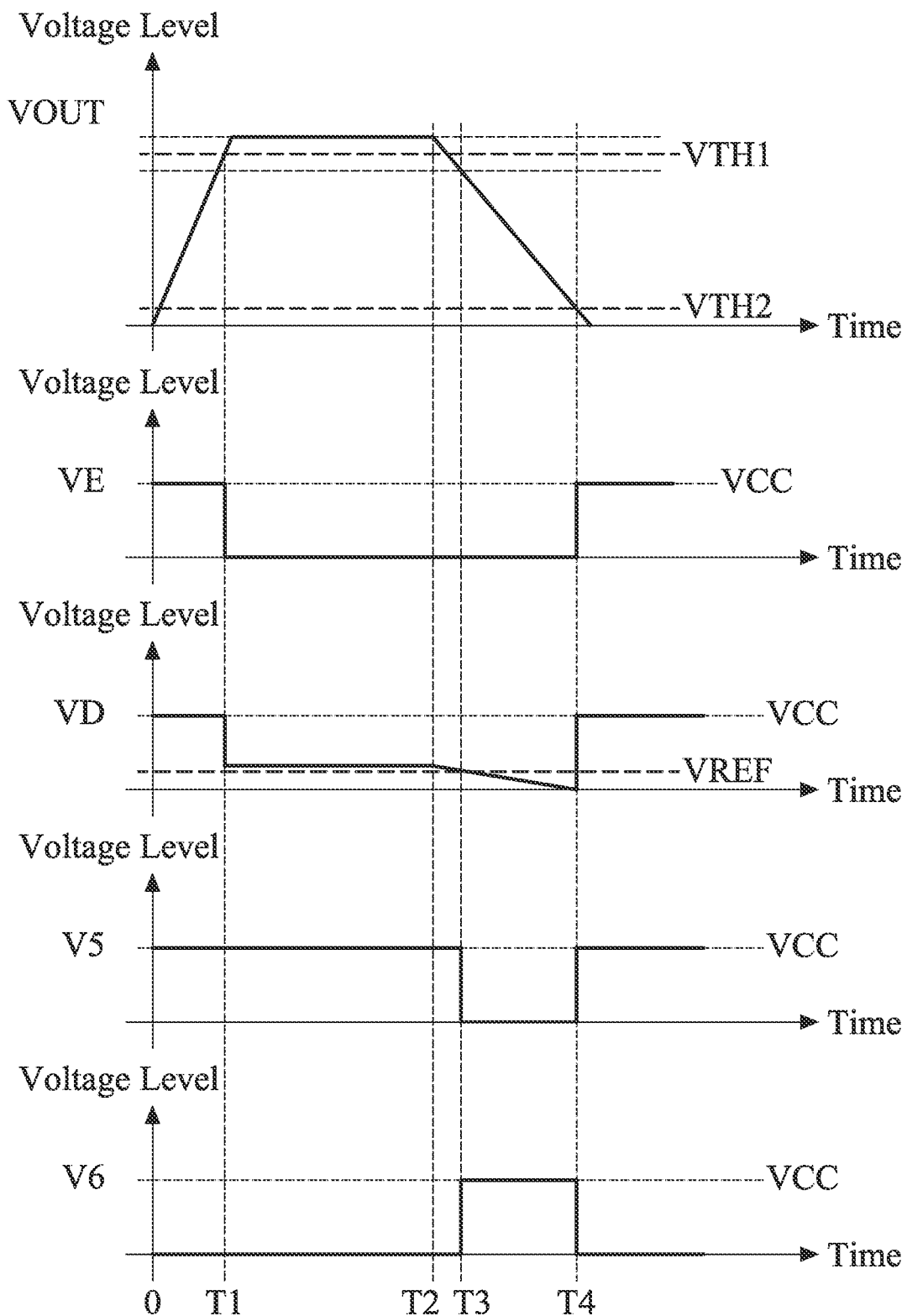
FIG. 5 is a diagram of voltage waveforms of an electronic device according to an embodiment of the invention.

FIG. 5 is a diagram of voltage waveforms of the electronic device 300 according to an embodiment of the invention. Please refer to FIG. 3 and FIG. 5 together to understand the operational principles of the invention.

Initially, the output voltage VOUT gradually becomes higher, but does not reach the first threshold voltage VTH1. The hysteresis voltage VE and the divided voltage VD are both maintained at high logic levels (it is assumed that the diode D1 is ideal with a cut-in voltage equal to 0V). Since the divided voltage VD is higher than the reference voltage VREF, the equivalent switch element 342 of the voltage comparator 340 can be opened. At this time, the voltage V5 at the fifth node N5 is pulled up to the supply voltage VCC so as to enable the first transistor M1, and the voltage V6 at the sixth node N6 is pulled down to the ground voltage VSS so as to disable the second transistor M2.

At a first time point T1, the output voltage VOUT rises up and reaches the first threshold voltage VTH1, and the hysteresis voltage VE is switched from the high logic level to the low logic level. Thus, the diode D1 is turned off, and it does not affect the divided voltage VD. At this time, the relationship between the divided voltage VD and the output voltage VOUT may be described according to the following equation (1):

$$VD = \left(\frac{R4}{R3+R4}\right) \cdot VOUT \quad (1)$$

where "VD" represents the voltage level of the divided voltage VD, "VOUT" represents the voltage level of the output voltage VOUT, "R3" represents the resistance of the third resistor R3, and "R4" represents the resistance of the fourth resistor R4.

At a second time point T2, the output voltage VOUT and its relative divided voltage VD begin to become lower. Next, at a third time point T3, the divided voltage VD begins to be lower than the reference voltage VREF, and thus the equivalent switch element 342 of the voltage comparator 340 is switched from an opened state into a closed state. At this time, the voltage V5 at the fifth node N5 is pulled down to the ground voltage VSS so as to disable the first transistor M1, and the voltage V6 at the sixth node N6 is pulled up to the supply voltage VCC so as to enable the second transistor M2.

Finally, at a fourth time point T4, the output voltage VOUT drops down and reaches to the second threshold voltage VTH2, and the hysteresis voltage VE is switched from the low logic level back to the high logic level. At this time, the divided voltage VD is also switched from the low logic level back to the high logic level. Therefore, the first transistor M1 is enabled again, and the second transistor M2 is disabled again (similar to the initial operation).

According to the measurement of FIG. 5, only when the second transistor M2 is enabled, the control circuit 330 can use the discharge resistor RD to perform a discharging operation to the output voltage VOUT at the output node NOUT. Conversely, when the second transistor M2 is disabled, the discharge resistance with respect to the output node NOUT approaches to infinity, and the aforementioned discharging operation is stopped. With such a design, the output node NOUT of the electronic device 300 has a relatively large discharge resistance and relatively small non-ideal loss during the charging operation (e.g., from the first time point T1 to the second time point T2). In addition, the output node NOUT of the electronic device 300 has a relatively small discharge resistance and relatively short discharge time during the discharging operation (e.g., from the third time point T3 to the fourth time point T4). It should be noted that the total manufacturing cost can be further reduced because the electronic device 300 neither uses any CPU (Central Processing Unit) nor uses any MCU (Microcontroller Unit).

In some embodiments, the element parameters of the electronic device 100 (or 300) will be described as follows. The first threshold voltage VTH1 may be about 11.5V. The second threshold voltage VTH2 may be about 1V. The resistance ratio of the third resistor R3 to the fourth resistor R4 may be 4.5. The resistance of the fifth resistor R5 may be about 100 kΩ. The resistance of the sixth resistor R6 may be about 100 kΩ. The resistance of the discharge resistor RD may be from 1Ω to 10Ω, such as about 6Ω. The supply voltage VCC may be about 5V. The ground voltage VSS may be about 0V. The reference voltage VREF may be about 2V. It should be understood that the above element parameters are merely exemplary, which are adjustable according to different requirements.

The invention proposes a novel electronic device. According to practical measurements, the electronic device using the aforementioned design have the advantages of reducing non-ideal loss, increasing the discharge speed, and decreasing the manufacturing cost, and therefore it is suitable for application in a variety of devices.

Note that the above voltages, currents, resistances, inductances, capacitances and other element parameters are not limitations of the invention. A designer can adjust these settings according to different requirements. The electronic device of the invention is not limited to the configurations of FIGS. 1-5. The invention may merely include any one or more features of any one or more embodiments of FIGS. 1-5. In other words, not all of the features displayed in the figures should be implemented in the electronic device of the invention. Although the embodiments of the invention use MOSFET as examples, the invention is not limited thereto, and those skilled in the art may use other types of transistors, such as BJT (Bipolar Junction Transistor), JFET (Junction Gate Field Effect Transistor), FinFET (Fin Field Effect Transistor), etc., without affecting the performance of the invention.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An electronic device, comprising:
   a hysteresis circuit, having a first threshold voltage and a second threshold voltage, wherein the hysteresis circuit generates a hysteresis voltage according to an output voltage at an output node;
   a voltage divider circuit, generating a divided voltage according to the output voltage and the hysteresis voltage;
   a discharge resistor; and
   a control circuit, having a reference voltage, and monitoring the divided voltage, wherein if the divided voltage is lower than the reference voltage, the control circuit uses the discharge resistor to perform a discharging operation to the output voltage at the output node.

2. The electronic device as claimed in claim 1, wherein if the divided voltage is higher than or equal to the reference voltage, the control circuit disables the discharge resistor and stops the discharging operation.

3. The electronic device as claimed in claim 1, wherein if the output voltage rises up and reaches the first threshold voltage, the hysteresis voltage is switched to a low logic level, and if the output voltage drops down and reaches the second threshold voltage, the hysteresis voltage is switched to a high logic level.

4. The electronic device as claimed in claim 1, wherein the hysteresis circuit comprises:
   an operational amplifier, wherein the operational amplifier has a positive input terminal coupled to a first node, a negative input terminal for receiving the output voltage, and an output terminal coupled to a second node for outputting the hysteresis voltage;
   a first resistor, wherein the first resistor has a first terminal coupled to the second node, and a second terminal coupled to the first node;
   a second resistor, wherein the second resistor has a first terminal coupled to the first node, and a second terminal coupled to a third node; and
   a DC (Direct Current) voltage source, wherein the DC voltage source has a positive electrode coupled to the third node, and a negative electrode coupled to a ground voltage.

5. The electronic device as claimed in claim 4, wherein the voltage divider circuit comprises:
   a diode, wherein the diode has an anode coupled to the second node for receiving the hysteresis voltage, and a cathode coupled to a fourth node for outputting the divided voltage;
   a third resistor, wherein the third resistor has a first terminal coupled to the output node for receiving the output voltage, and a second terminal coupled to the fourth node; and
   a fourth resistor, wherein the fourth resistor has a first terminal coupled to the fourth node, and a second terminal coupled to the ground voltage.

6. The electronic device as claimed in claim 5, wherein the control circuit comprises:
   a voltage comparator, comparing the divided voltage with the reference voltage, wherein if the divided voltage is lower than the reference voltage, the voltage comparator couples a fifth node to the ground voltage, and if the divided voltage is higher than or equal to the reference voltage, the voltage comparator does not couple the fifth node to the ground voltage.

7. The electronic device as claimed in claim 6, wherein the control circuit further comprises:
   a fifth resistor, wherein the fifth resistor has a first terminal coupled to a supply node for receiving a supply voltage, and a second terminal coupled to the fifth node; and
   a sixth resistor, wherein the sixth resistor has a first terminal coupled to the supply node, and a second terminal coupled to a sixth node.

8. The electronic device as claimed in claim 7, wherein the control circuit further comprises:
   a first transistor, wherein the first transistor has a control terminal coupled to the fifth node, a first terminal coupled to the ground voltage, and a second terminal coupled to the sixth node.

9. The electronic device as claimed in claim 8, wherein the control circuit further comprises:
   a second transistor, wherein the second transistor has a control terminal coupled to the sixth node, a first terminal coupled to the ground voltage, and a second terminal coupled to a seventh node;
   wherein the discharge resistor has a first terminal coupled to the output node, and a second terminal coupled to the seventh node.

10. The electronic device as claimed in claim 9, wherein each of the first transistor and the second transistor is an NMOS transistor (N-type Metal Oxide Semiconductor Field Effect Transistor).

* * * * *